United States Patent
Aronowich et al.

(10) Patent No.: US 8,024,216 B2
(45) Date of Patent: *Sep. 20, 2011

(54) COMPUTER IMPLEMENTED METHOD AND SYSTEM FOR COMPUTING AND EVALUATING DEMAND INFORMATION

(75) Inventors: Michael Aronowich, Haifa (IL); Sofia Mariamova, Ashdod (IL); Ofra Natan, Ramat Gan (IL); Henry Harel, Tel Aviv (IL)

(73) Assignee: Demantra Ltd., Ramat Gan (IL)

( * ) Notice: Subject to any disclaimer, the term of this patent is extended or adjusted under 35 U.S.C. 154(b) by 404 days.

This patent is subject to a terminal disclaimer.

(21) Appl. No.: 12/141,771

(22) Filed: Jun. 18, 2008

(65) Prior Publication Data

US 2008/0249845 A1    Oct. 9, 2008

Related U.S. Application Data

(63) Continuation of application No. 10/098,615, filed on Mar. 18, 2002, now Pat. No. 7,406,435.

(51) Int. Cl.
*G06Q 10/00* (2006.01)
(52) U.S. Cl. ...................... 705/7.31; 705/7.25
(58) Field of Classification Search .............. 705/10, 705/7.25, 7.31
See application file for complete search history.

(56) References Cited

U.S. PATENT DOCUMENTS

| 5,299,115 | A | 3/1994 | Fields et al. |
| 5,526,257 | A | 6/1996 | Lerner |
| 5,608,621 | A | 3/1997 | Caveney et al. |
| 5,712,985 | A | 1/1998 | Lee et al. |
| 5,819,232 | A | 10/1998 | Shipman |
| 5,963,919 | A | 10/1999 | Brinkley et al. |
| 6,006,202 | A | 12/1999 | Ramaswamy et al. |
| 6,026,370 | A | 2/2000 | Jermyn |
| 6,029,139 | A | 2/2000 | Cunningham et al. |
| 6,032,125 | A | 2/2000 | Ando |
| 6,188,989 | B1 | 2/2001 | Kennedy |
| 6,205,431 | B1 | 3/2001 | Willemain et al. |
| 6,249,774 | B1 | 6/2001 | Roden et al. |
| 6,253,187 | B1 | 6/2001 | Fox |
| 7,080,026 | B2 | 7/2006 | Singh et al. |
| 7,406,435 | B2 * | 7/2008 | Aronowich et al. ............ 705/10 |
| 2001/0020230 | A1 | 9/2001 | Kaneko et al. |
| 2002/0143669 | A1 | 10/2002 | Scheer |
| 2002/0188499 | A1 | 12/2002 | Jenkins et al. |

OTHER PUBLICATIONS

"Poisson Distribution from Wolfram MathWorld" downloaded from http://mathworld.wolfram.com/PoissonDistribution.html on Oct. 23, 2007, 5 pages.

(Continued)

*Primary Examiner* — Thomas Dixon
*Assistant Examiner* — Gerald C Vizvary
(74) *Attorney, Agent, or Firm* — Kilpatrick Townsend & Stockton LLP

(57) ABSTRACT

Computer implemented method and system for improving demand forecasting by estimating the hidden demand at an occurrence of a sellout using a single parameter probability distribution with a parameter assuming a forecasted mean demand value derived from a statistical seasonal causal time series forecasting model of count data on a new data set of sales values excluding truncated sales values at occurrences of sellouts. The present invention also provides for new more accurate performance evaluation techniques together with new performance metrics for evaluating an actual draw and for comparing a recommended draw to an actual draw.

16 Claims, 10 Drawing Sheets

OTHER PUBLICATIONS

Agrawal, N. and Smith, S. A. (1996) Estimating negative binomial demand for retail inventory management with unobservable lost sales, Nav Res Logistics 43, 839-861.

Bradford, J.W., Sugrue, P.K. (1997). Estimating the demand pattern for C category items. Journal of the Operational Research Society, v48n5, 530-532.

Bradford, J.W., Sugrue, P.K. (1997). Estimating the demand pattern for C category items. Journal of the Operational Research Society, v48n5, 530-532 (full article).

Conrad, S. A. "Sales data and the estimation of demand," in Operational Research Quarterly, v27, n1, 1976, pp. 123-127.

Hill, Roger M. "On the suboptimality of (S-1, S) lost sales inventory policies," in International Journal of Production Economics, v59, 1999, pp. 387-393.

K.A. Artto, E. Pylkkanen; An effective procedure for the distribution of magazines; Int'l. Trans. in Op. Res. 6 (1999) 289-310.

Lau, Hon-Shiang and Lau, Amy Hing-LIng. "Estimating the demand disttributions of single-period items having frequent stockouts," in European Journal of Operational Research, v92, 1996, pp. 254-265.

PC Bell-Richard Ivey School of Business; Forecasting demand variation when there are stockouts; Journal of the Operational Research Society 2000; 51: pp. 358-363.

Peter C. Bell; A New Procedure for the Distribution of Periodicals; J. Opl. Res. Soc. 1978; vol. 29, 5, pp. 427-434.

Peter C. Bell; Adaptive Sales Forecasting with Many Stockouts; J. Op. Res. Soc. 1981; vol. 32, pp. 865 to 873.

Price, B., Haynsworth, H.C. (1986). How to Prepare Inventory Forecasts for Very Low Demand Items. Journal of Business Forecasting, v5n2, 21-22.

Robbins, Herbert. "Prediction and Estimation for the Compound Poisson Distribution," in Proceedings National Academy of Sciences, vol. 74, No. 7 (Jul. 1977), pp. 2670-2671.

William E. Wecker; Predicting Demand from Sales Data in the Presence of Stockouts; Management Science, vol. 24, No. 10 Jun. 1978; pp. 1043-1054.

* cited by examiner

| NO. | CASE | BIAS | | | | | Δ | | | |
|---|---|---|---|---|---|---|---|---|---|---|
| | | ES-BS | ER-BR | ESO-BSO | EST-BST | ES-S | ER-R | ESO-SO | EST-ST |
| 1 | H=0, RD>S | 0 | 0 | 0 | 0 | 0 | RD-D [+/-] | 0 | 0 |
| 2 | H=0, RD=S | 0 | 0 | -1 | 0 | 0 | RD-D [-] | 0 | 0 |
| 3 | RD<S | 0 | 0 | 0 | +1 | RD-S [+] | S-D [-] | 1-SO [1/0] | S-RD [+] |
| 4 | H≠0, S≤RD<S+H | RD-S [+] | S-RD [-] | δ(RD=S) | S+H-RD [+] | RD-S [+] | 0 | 0 | S-RD [-] |
| 5 | H≠0, S+H≤RD | H | -H | 0 | 0 | H | RD-S-H [+] | -SO [1/0] | -H |

FIG.7

|  | ACTUAL VALUES | | | | | | | |
|---|---|---|---|---|---|---|---|---|
| DAY | S | D | R | SO | MDV | H | RD | CASE |
| 1 | 30 | 30 | 0 | 1 | 26 | 5 | 35 | 5 |
| 2 | 33 | 35 | 2 | 0 | 28 | 0 | 32 | 3 |
| 3 | 32 | 34 | 2 | 0 | 29 | 0 | 33 | 1 |
| 4 | 31 | 37 | 6 | 0 | 29 | 0 | 33 | 1 |
| 5 | 33 | 37 | 4 | 0 | 31 | 0 | 36 | 1 |
| 6 | 32 | 37 | 5 | 0 | 29 | 0 | 33 | 1 |
| 7 | 21 | 23 | 2 | 0 | 22 | 0 | 26 | 1 |
| 8 | 30 | 32 | 2 | 0 | 26 | 0 | 27 | 3 |
| 9 | 22 | 22 | 0 | 1 | 28 | 4 | 32 | 5 |
| 10 | 31 | 40 | 9 | 0 | 28 | 0 | 32 | 1 |
| 11 | 32 | 40 | 8 | 0 | 29 | 0 | 33 | 1 |
| 12 | 30 | 36 | 6 | 0 | 30 | 0 | 35 | 1 |
| 13 | 26 | 34 | 8 | 0 | 29 | 0 | 33 | 1 |
| 14 | 22 | 23 | 1 | 0 | 21 | 0 | 25 | 1 |
| 15 | 28 | 32 | 4 | 0 | 25 | 0 | 29 | 1 |
| 16 | 26 | 32 | 6 | 0 | 28 | 0 | 32 | 1 |
| 17 | 27 | 35 | 17 | 17 | 17 | 0 | 32 | 1 |
| 18 | 27 | 35 | 8 | 0 | 28 | 0 | 33 | 1 |
| 19 | 31 | 31 | 0 | 1 | 30 | 5 | 37 | 5 |
| 20 | 29 | 32 | 3 | 0 | 28 | 0 | 32 | 1 |
| 21 | 23 | 23 | 0 | 1 | 21 | 4 | 23 | 4 |
| 22 | 29 | 32 | 3 | 0 | 25 | 0 | 30 | 1 |
| 23 | 31 | 32 | 1 | 0 | 27 | 0 | 32 | 1 |
| 24 | 31 | 32 | 1 | 0 | 28 | 0 | 32 | 1 |
| 25 | 29 | 32 | 3 | 0 | 29 | 0 | 33 | 1 |
| 26 | 30 | 32 | 2 | 0 | 30 | 0 | 31 | 1 |
| 27 | 27 | 30 | 3 | 0 | 28 | 0 | 32 | 1 |
| 28 | 23 | 23 | 0 | 1 | 21 | 4 | 22 | 3 |
| 29 | 25 | 32 | 7 | 0 | 25 | 0 | 29 | 1 |
| 30 | 27 | 30 | 3 | 0 | 27 | 0 | 28 | 1 |
| 31 | 28 | 30 | 2 | 0 | 27 | 0 | 28 | 2 |
| TOTAL | 876 | 985 | 109 | 5 | 841 | 22 | 960 | |

FIG.9A

| EXPECTED VALUES | | | | BIAS | | | |
| --- | --- | --- | --- | --- | --- | --- | --- |
| ES | ER | ESO | EST | S | R | SO | ST |
| 35 | 0 | 0 | 0 | 5 | -5 | 0 | 0 |
| 32 | 0 | 1 | 1 | 0 | 0 | 0 | 0 |
| 32 | 1 | 0 | 0 | 0 | 0 | 0 | 0 |
| 31 | 2 | 0 | 0 | 0 | 0 | 0 | 0 |
| 33 | 3 | 0 | 0 | 0 | 0 | 0 | 0 |
| 32 | 1 | 0 | 0 | 0 | 0 | 0 | 0 |
| 21 | 5 | 0 | 0 | 0 | 0 | 0 | 0 |
| 27 | 0 | 1 | 3 | 0 | 0 | 0 | 0 |
| 26 | 6 | 0 | 0 | 4 | -4 | 0 | 0 |
| 31 | 1 | 0 | 0 | 0 | 0 | 0 | 0 |
| 32 | 1 | 0 | 0 | 0 | 0 | 0 | 0 |
| 30 | 5 | 0 | 0 | 0 | 0 | 0 | 0 |
| 26 | 7 | 0 | 0 | 0 | 0 | 0 | 0 |
| 22 | 3 | 0 | 0 | 0 | 0 | 0 | 0 |
| 28 | 1 | 0 | 0 | 0 | 0 | 0 | 0 |
| 26 | 6 | 0 | 0 | 0 | 0 | 0 | 0 |
| 27 | 5 | 0 | 0 | 0 | 0 | 0 | 0 |
| 27 | 6 | 0 | 0 | 0 | 0 | 0 | 0 |
| 36 | 1 | 0 | 0 | 5 | 0 | 0 | 0 |
| 29 | 3 | 0 | 0 | 0 | -5 | 0 | 0 |
| 23 | 0 | 1 | 4 | 0 | 0 | 0 | 4 |
| 29 | 1 | 0 | 0 | 0 | 0 | 0 | 0 |
| 31 | 1 | 0 | 0 | 0 | 0 | 0 | 0 |
| 31 | 1 | 0 | 0 | 0 | 0 | 0 | 0 |
| 29 | 4 | 0 | 0 | 0 | 0 | 0 | 0 |
| 30 | 1 | 0 | 0 | 0 | 0 | 0 | 0 |
| 27 | 5 | 0 | 0 | 0 | 0 | 0 | 0 |
| 22 | 0 | 1 | 5 | 0 | 0 | 0 | 4 |
| 25 | 0 | 0 | 0 | 0 | 0 | 0 | 0 |
| 27 | 1 | 0 | 0 | 0 | 0 | 0 | 0 |
| 28 | 0 | 0 | 0 | 0 | 0 | -1 | 0 |
| 885 | 75 | 4 | 13 | 14 | -14 | -1 | 8 |

FIG.9B

| Δ | | | |
|---|---|---|---|
| ES−S | ER−R | ESO−SO | EST−ST |
| 5 | 0 | −1 | −5 |
| −1 | −2 | 1 | 1 |
| 0 | −1 | 0 | 0 |
| 0 | −4 | 0 | 0 |
| 0 | −1 | 0 | 0 |
| 0 | −4 | 0 | 0 |
| 0 | 3 | 0 | 0 |
| −3 | −2 | 1 | 3 |
| 4 | 6 | −1 | −4 |
| 0 | −8 | 0 | 0 |
| 0 | −7 | 0 | 0 |
| 0 | −1 | 0 | 0 |
| 0 | −1 | 0 | 0 |
| 0 | 2 | 0 | 0 |
| 0 | −3 | 0 | 0 |
| 0 | 0 | 0 | 0 |
| 0 | −3 | 0 | 0 |
| 0 | −2 | 0 | 0 |
| 5 | 1 | −1 | −5 |
| 0 | 0 | 0 | 0 |
| 0 | 0 | 0 | 0 |
| 0 | −2 | 0 | 0 |
| 0 | 0 | 0 | 0 |
| 0 | 0 | 0 | 0 |
| 0 | 1 | 0 | 0 |
| 0 | −1 | 0 | 0 |
| 0 | 2 | 0 | 0 |
| −1 | 0 | 0 | 1 |
| 0 | −3 | 0 | 0 |
| 0 | −2 | 0 | 0 |
| 0 | −2 | 0 | 0 |
| 9 | −34 | −1 | −9 |

FIG.9C

COMPUTER IMPLEMENTED METHOD AND SYSTEM FOR COMPUTING AND EVALUATING DEMAND INFORMATION

CROSS-REFERENCES TO RELATED APPLICATIONS

This application is a continuation of and claims priority from U.S. patent application Ser. No. 10/098,615, filed Mar. 18, 2002, which is incorporated by reference.

FIELD OF THE INVENTION

The invention is in the field of computer implemented methods and systems for computing and evaluating demand information in general, and demand information for perishable consumer items based on sales data including sellouts in peculiar.

GLOSSARY OF TERMS

The following terms listed alphabetically together with their acronyms are employed in the description and claims of the present invention:

Adjusted Sales Data
Sales data with expected full demand (EFD) values replacing truncated sales values (S) at occurrences of sellouts.

Availability
The probability of fully satisfying the demand for a consumer item at an outlet under a given draw or, in other words, satisfying demand for the consumer item at the outlet without an occurrence of a sellout due to demand being at least equal to draw.

Distribution Policy
Delivered quantities of a consumer item at each outlet of a supply chain supplying a multitude of outlets in accordance with a predetermined business strategy.

Draw (D)
An industry term referring to the delivered quantity of a consumer item to a particular outlet under a given distribution policy.

Draw Bounded Sales (BS)
Sales quantities for a consumer item which would be nominally recorded on the assumption that the consumer item is delivered in accordance with a recommended draw instead of an actual draw i.e. sales quantities disregarding hidden demand at occurrences of sellouts.

Draw Bounded Returns (BR)
Return of a consumer item which would be nominally recorded on the assumption that the consumer item is delivered in accordance with a recommended draw instead of an actual draw i.e. returns disregarding hidden demand at occurrences of sellouts.

Draw Bounded Sellout (BSO)
A sellout of a consumer item which would be nominally recorded on the assumption that the consumer item is delivered in accordance with a recommended draw instead of an actual draw but disregarding hidden demand at occurrences of sellouts.

Draw Bounded Stockout (BST)
A quantity of unsatisfied demand which would be nominally recorded on the assumption that the consumer item is delivered in accordance with a recommended draw instead of an actual draw i.e. quantity of unsatisfied demand disregarding hidden demand at occurrences of sellouts.

Expected Full Demand (EFD)
The sum of the truncated sales value at the occurrence of a sellout of a consumer item at an outlet and the estimated hidden demand for the consumer item at the outlet at the occurrence of the sellout, namely, EFD=S+H.

Expected Returns (ER)
Returns of a consumer item which would be recorded on the assumption that the consumer item is delivered in accordance with a recommended draw instead of an actual draw taking into account hidden demand at occurrences of sellouts, namely, ER=RD−ES, for comparison to returns (R) due to an actual draw.

Expected Sales (ES)
Sales of a consumer item which would be recorded on the assumption that the consumer item is delivered in accordance with a recommended draw instead of an actual draw taking into account hidden demand at occurrences of sellouts, namely, ES=min(S+H, RD) for comparison to sales (S) due to an actual draw.

Expected Sellout (ESO)
A sellout of a consumer item at an outlet which would be recorded on the assumption that the consumer item is delivered in accordance with a recommended draw instead of an actual draw taking into account hidden demand at occurrences of sellouts for comparison to a sellout (SO) due to an actual draw.

Expected Stockout (EST)
Quantity of unsatisfied demand for a consumer item at an outlet at an occurrence of an expected sellout which would be recorded on the assumption that the consumer item is delivered in accordance with a recommended draw instead of an actual draw taking into account hidden demand at occurrences of sellouts for comparison to a stockout (ST) due to an actual draw.

Hidden Demand (H)
The unknown stockout value for a consumer item at an outlet at an occurrence of a sellout.

Mean Demand Value
The expected value of demand for a consumer item at an outlet that occurs at a given point of time.

Perishable Consumer Item
A consumer item with a limited shelf life at the end of which it loses most, if not all, of its consumer value, and which is typically not replenished to prevent an occurrence of a sellout. Perishable consumer items can include perishable goods, for example, fruit, vegetables, flowers, and the like, and non-perishable goods, for example, printed media publications, namely, daily newspapers, weeklies, monthlies, and the like.

Recommended Draw (RD)
A recommended draw for a consumer item at an outlet for comparison to an actual draw. The recommended draw preferably is arrived at by forecasting demand and adding safety stock to provide a predetermined level of availability for the consumer item at the outlet.

Returns (R)
An industry term referring to the number of unsold copies of a consumer item on non-sellout days, namely, R=D−S.

Safety Stock (SS)
An industry term referring to the number of extra stock of a consumer item above a demand forecast required to provide a predetermined level of availability. The safety stock for a consumer item is typically rounded to the nearest integer.

Sellout (SO)
An industry term referring to an occurrence of demand being equal or greater than a delivered quantity of a consumer item at an outlet, namely, SO=$\delta$(D=S) where $\delta$ is a binary indicator function:

$$\delta(\text{condition}) = \begin{cases} 1, & \text{if condition is true} \\ 0, & \text{else} \end{cases}$$

Stockout (ST)

The quantity of unsatisfied demand for a consumer item at an occurrence of a sellout. The stockout for a perishable consumer item is typically unknown and therefore stockout and hidden demand for such a consumer item are the same, namely, ST=H.

BACKGROUND OF THE INVENTION

One computer implemented approach for computing demand forecast information for a demand forecast application involves defining a so-called demand forecast tree capable of being graphically represented by a single top level node (00) with at least two branches directly emanating therefrom, each branch having at least one node, for example, bottom level node (11) (see FIG. 1). The demand forecast information is computed on the basis of time series of observations typically associated with bottom level nodes by a forecast engine capable of determining a mathematical simulation model for a demand process. One such forecast engine employing statistical seasonal causal time series models of count data is commercially available from Demantra Ltd, Israel, under the name Demantra™ Demand Planner.

One exemplary demand forecast application is the media distribution problem, namely, determining the number of copies of a daily newspaper to be delivered daily to an outlet to minimize two mutually conflicting indices commonly quantified for evaluating the efficacy of a distribution policy for a newspaper over an evaluation period: the frequency of sellouts, and the number of return typically expressed in percentage terms of total returns over total draw. In this connection, it is a common practice in the industry that a draw for a newspaper at an outlet for a given day is greater than its demand forecast at that outlet for that day so to reduce the probability of a sellout but with the inherent downside that the probability of returns is greater. In the case of distribution systems for newspapers, the safety stock is typically intended to provide a level of safety of around 80±10% for a given probability function for the demand for the newspaper at the outlet.

The media distribution problem is a particular realization of the well-known single period stochastic inventory problem which has been the subject of considerable academic interest. It has been long recognized that occurrences of sellouts downwardly bias demand forecasts due to actual sales data reflecting stock availability levels as opposed to true demand. In view of this, researchers in the area of demand forecasting have developed procedures to cater for presence of sellouts by computing demand forecasts on adjusted sales data. One exemplar approach is set out in an article entitled "*Forecasting demand variation when there are stockouts*", Bell, P. C., Journal of the Operational Research Society (2000) 51, 358-363.

SUMMARY OF THE INVENTION

Conventional approaches for demand forecasting are based on the assumption that demand for a perishable consumer item is a stationary stochastic process, thereby rendering the estimating statistical moments of demand from historical sales data possible. Along these lines, conventional approaches assume that demand for a perishable consumer item may be successfully modeled by a Normal distribution, and that smoothing procedures may be employed for estimating demand at occurrences of sellouts to replace truncated sales values. Against this, the present invention is based on the notion that the demand process for a perishable consumer item at an outlet has a random but non-stationary nature, and thereby cannot be subjected to ensemble inferences based on a single realization thus negating the use of statistical moments to estimate parameters. Hence, in accordance with the present invention, the mean demand values for a perishable consumer item at an outlet over time are presupposed to be the outcome of a stochastic process which can be simulated by a forecast model whilst actual sales for the perishable consumer item at the outlet over time is a particular realization of such a process but upper bounded by the draw at each point in time. Moreover, demand at a future point in time is a random variable with a conditional probability distribution conditioned on the forecasted mean demand value at that point in time.

Based on this realization, the present invention proposes that hidden demand for a perishable consumer item at an occurrence of a sellout be preferably estimated by a single parameter conditional probability distribution whose parameter is the forecasted mean demand value determined by a forecast engine employing seasonal causal time series models of count data commercially available, for example, from Demantra Ltd, Israel. The advantage of this approach is that it takes into account important information, for example, monthly and weekly seasonal variations, predictable and sporadic events, and the like, which is liable to be overlooked if such an approach is not employed. Moreover, it has been empirically found that demand for a wide range of perishable consumer items at an outlet is adequately modeled by a random variable X with a Poisson (λ) conditional probability distribution conditioned on the forecasted mean demand value λ, whereby the hidden demand at an occurrence of a sellout is given by:

$$H = E(X - D) \mid X \geq D) = \lambda\left(1 + \frac{f(D)}{1 - F(D)}\right) - D$$

where f(.) is the Poisson probability distribution function, F(.) is the Poisson cumulative distribution function, and λ assumes the value of the mean demand value. Alternative single parameter conditional probability distributions may include inter alia exponential, geometric, and the like. It should be noted that the approach in accordance with the present invention precludes negative demand values which are inconceivable but theoretically possible in the case of the hitherto relied upon assumption that demand can be modeled by a Normal distribution.

The present invention employs hidden demand not only to improve the accuracy of demand forecasting for perishable consumer items but also to generate important new performance metrics for more accurately evaluating the efficacy of a draw for a perishable consumer item at an outlet including inter alia estimated stockout over an evaluation period, ratio of estimated stockout to draw, and the like. Moreover, the present invention employs hidden demand for more accurately comparing a recommended draw for a perishable consumer item at an outlet to an actual draw since draw bounded sales data as opposed to adjusted non draw bounded sales data compensating for hidden demand at occurrences of sellouts inherently prejudices against a recommended draw as will now become clear by way of the example below. In point of fact, there are five mutually exclusive and exhaustive cases which may possibly arise depending on the values of a recommended draw, an actual draw and sales at each time point which each impact various performance metrics differently as summarized in the table of FIG. 7.

Assuming that the draw of a newspaper at an outlet was 30 copies of which 29 were sold, a recommended draw of 33 copies would be unfavorably but fairly recorded with four returns as compared to the actual return of a single copy. But, if all 30 copies were sold, the recommended draw of 33 copies would be unfavorably recorded with three returns but this time unfairly since it belies the fact that in all likelihood at least one and possibly all three of the three returns would have been sold. Assuming that the hidden demand at the occurrence of the sellout occurring when all 30 copies were sold was, say, 2 copies, then the recommended draw of 33 copies would be unfavorably recorded with just one return but would be credited with two additional sold copies. But assuming that the hidden demand at the occurrence of the sellout was 4 copies, then the recommended draw of 33 copies would be unfavorably recorded with a sellout but with an additional three sold copies to its credit.

To summarize, the present invention facilitates improved forecasting at both at bottom level nodes and at higher level nodes, for example, say, at the level of a regional distributor. Moreover, the present invention provides for new more accurate performance evaluation techniques together with new performance metrics for evaluating an actual draw and for comparing a recommended draw to an actual draw.

BRIEF DESCRIPTION OF THE DRAWINGS

In order to better understand the invention and to see how it can be cared out in practice, a preferred embodiment will now be described, by way of a non-limiting example only, with reference to the accompanying drawings in which:

FIG. 7 is a table summarizing the five mutually exclusive and exhaustive cases which arise depending on the values of a recommended draw, an actual draw and sales for a perishable consumer item at an outlet for comparing the efficacy of a recommended draw against the efficacy of an actual draw;

FIGS. 9A-9C is a table enabling the comparison of the efficacy of a recommended draw for a newspaper for a month to that of the actual draw for the newspaper over the same month.

DETAILED DESCRIPTION OF THE PREFERRED EMBODIMENT

Figure 1:
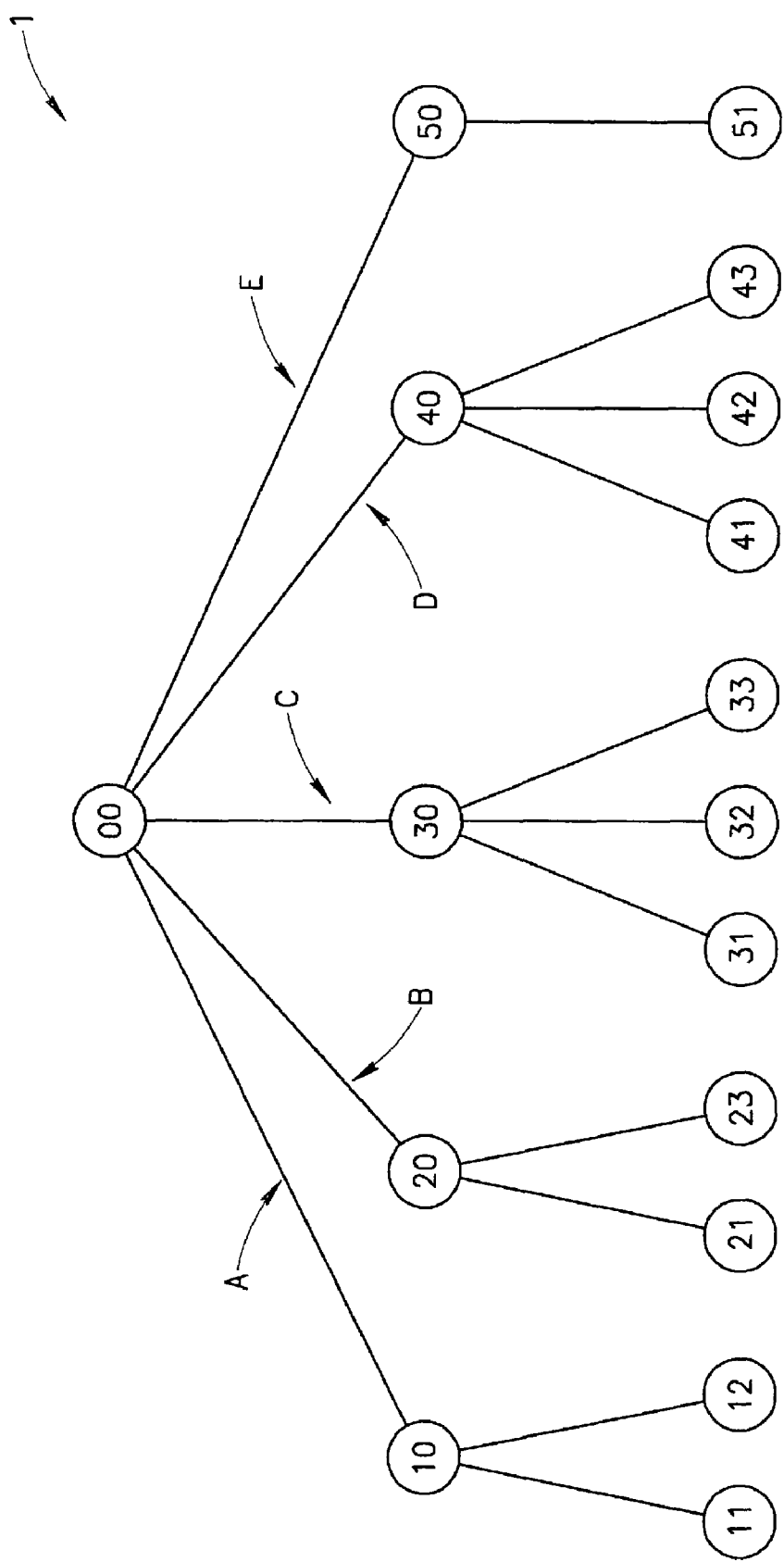
FIG. 1 is a pictorial representation showing a demand forecast tree for computing demand forecast information for five different perishable consumer items.
Figure 2:
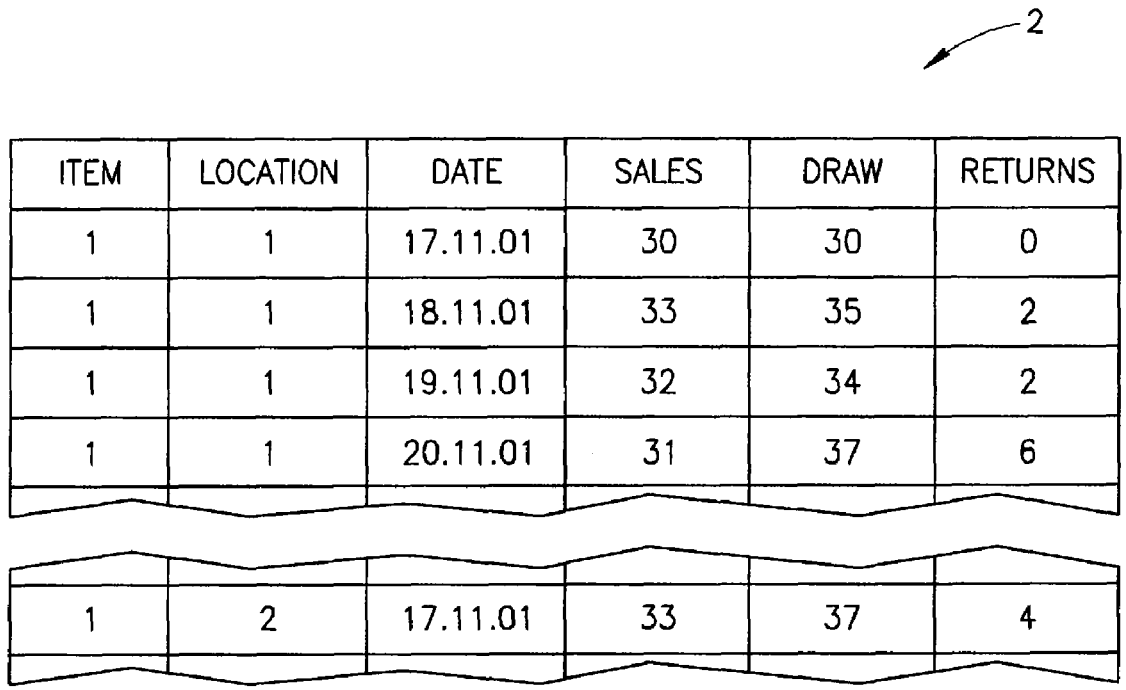
FIG. 2 is a table showing historical sales data associated with the demand forecast tree of FIG. 1.

FIG. 1 shows a demand forecast tree 1 having a single top level node (00) with five branches A, B, C, D and E for correspondingly representing the sale of Item I (top level-1 node (10)) at Locations 1 and 2 (bottom level nodes (11) and (21)), Item II (top level-1 node (20)) at Locations 1 and 3 (bottom level nodes (21) and (23)), Item III (top level-1 node (30)) at Location 1, 2 and 3 (bottom level nodes (31), (32) and (33)), Item IV (top level-1 node (40)) also at Locations 1, 2 and 3 (bottom level nodes (41), (42) and (43)); and Item V (top level-1 node (50)) at Location 1 (bottom level node (51)) only. FIG. 2 shows an exemplary table 2 containing historical sales data of Item I at the bottom level nodes (11) and (12). Similar tables exist for the sale of the other items at their respective outlets.

Figure 3:
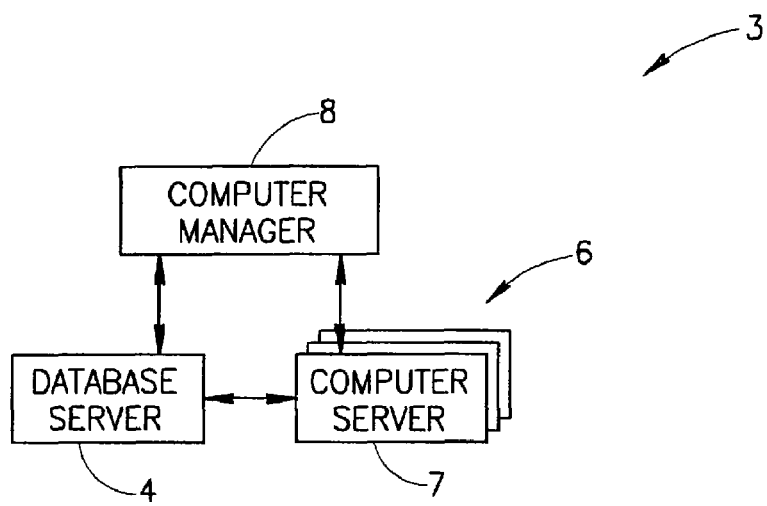
FIG. 3 is a pictorial representation showing a computer implemented system for implementing the present invention.

FIG. 3 shows a computer implemented system 3 as illustrated and described in commonly assigned co-pending U.S. patent application Ser. No. 10/058,830 entitled "Computer Implemented Method and System for Demand Forecast Applications", the contents are which are incorporated herein by reference, capable of implementing the present invention. The computer implemented system 3 includes a database server 4 for storing time series of sales values, a forecast engine 6 including two or more computer servers 7 each independently capable of computing demand forecast information for an entire branch of the demand forecast tree 1, and a computer manager 8 for allocating branches into tasks.

Figure 4:
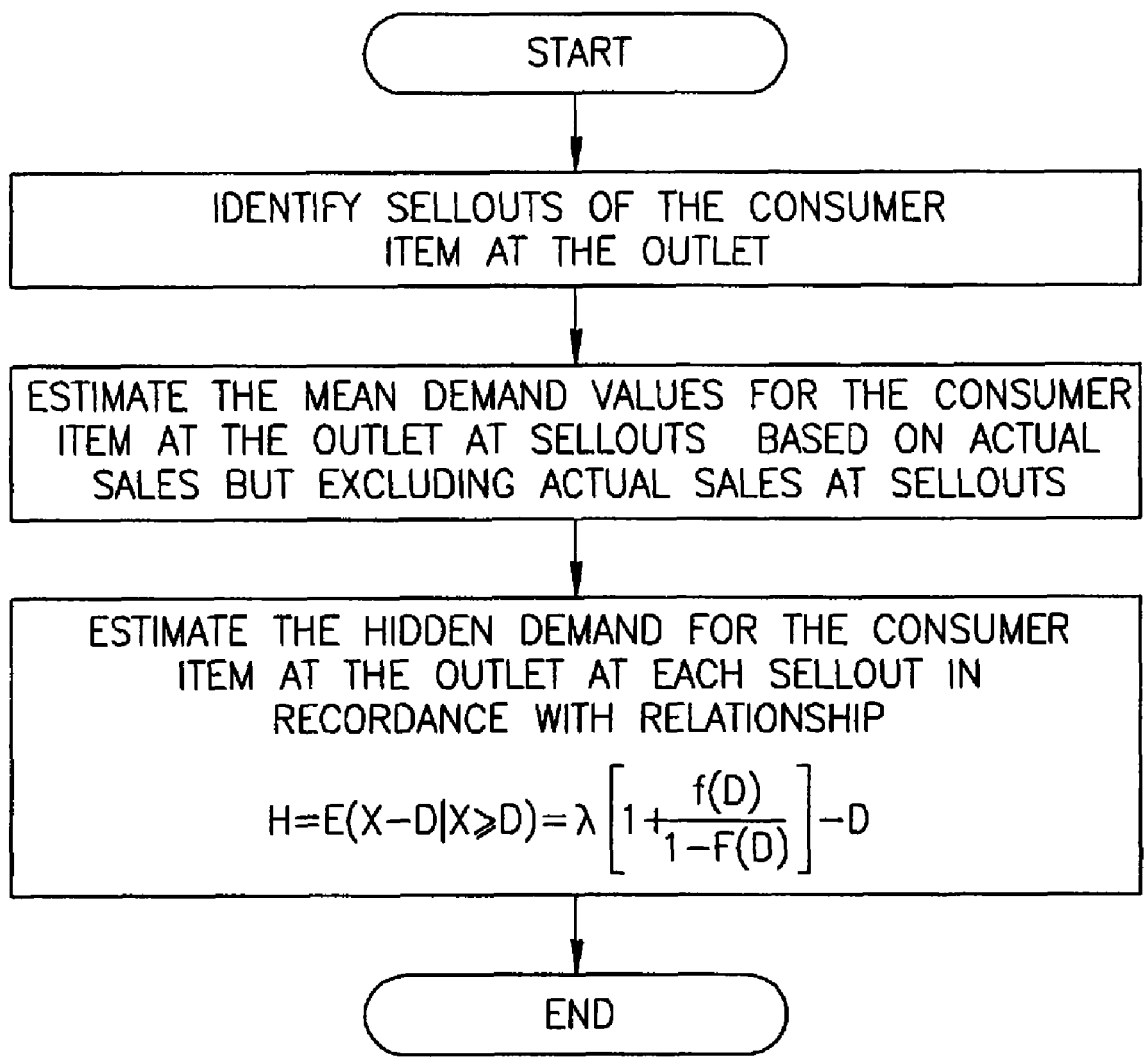
FIG. 4 is a flow char showing the steps for calculating the hidden demand for a consumer item at an outlet at an occurrence of a sellout in accordance with the present invention.
Figure 5:
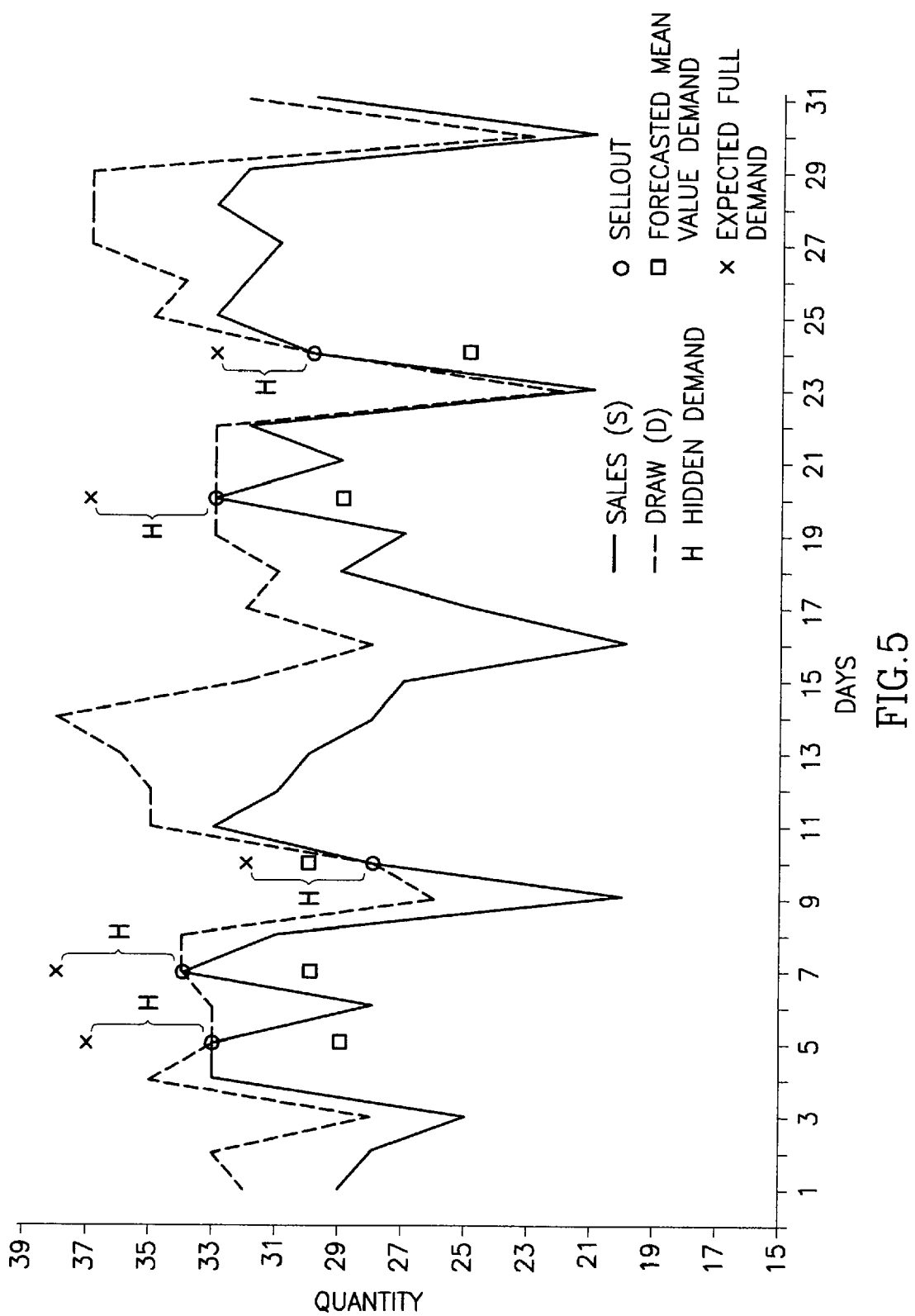
FIG. 5 is a graph showing the hidden demand for a newspaper at occurrences of sellouts over a month of sales as estimated in accordance with the present invention.

The evaluation of the efficacy of a distribution policy for a perishable consumer item, say, a newspaper, at an outlet over an evaluation period, say, a month, in accordance with the present invention is now described with reference to FIGS. 4 and 5. Sellouts of the newspaper at the outlet over the evaluation period are identified by comparing the number of sold copies (S) against draw (D) respectively shown as the solid graph line and the dashed graph line in FIG. 5. The sales values excluding truncated sales values are input to a forecast engine, for example, the Demantra™ Demand Planner, commercially available from Demantra Ltd, Israel, to estimate mean demand values typically rounded to the nearest integer for the newspaper at the sellouts over the month shown as squares in FIG. 5. The forecasted mean demand value at an occurrence of a sellout may be greater than, equal to or less than the sales at the sellout. For example, the forecasted mean demand value for Day 5 is 29 copies which is less than the draw of 33 copies whilst the forecasted mean demand value for Day 10 is 30 copies which is greater than the sales of 28 copies.

Based on the assumption that demand for the newspaper is a random variable X with a Poisson conditional probability distribution conditioned on the forecasted mean demand value $\lambda$, the hidden demand H at each sellout is estimated using the following expression $$H = E(X - D) | X \geq D) = \lambda\left(1 + \frac{f(D)}{1 - F(D)}\right) - D$$

For example, the hidden demand for Day 5 is 4 after having been rounded to the nearest integer based on the forecasted mean demand value $\lambda=29$ and the draw D=33. The expected full demand EFD for the newspaper that could be expected to be sold at the outlet are then calculated at each occurrence of a sellout as follows: EFD=D+H (see crosses in FIG. 5). Continuing the above example, the expected full demand for Day 5 is 33+4=37 copies. The performance metrics for evaluating the efficacy of the distribution policy for the newspaper at the outlet over the evaluation period can include inter alia: the total hidden demand for the newspaper at the outlet over the evaluation period; the ratio of total hidden demand to total sales over the evaluation period; and the ratio of total hidden demand to draw over the evaluation period. In the present case, the total hidden demand for the newspaper is 19 copies which is equal to 2.12% of sales and 1.90% of draw.

Figure 6:
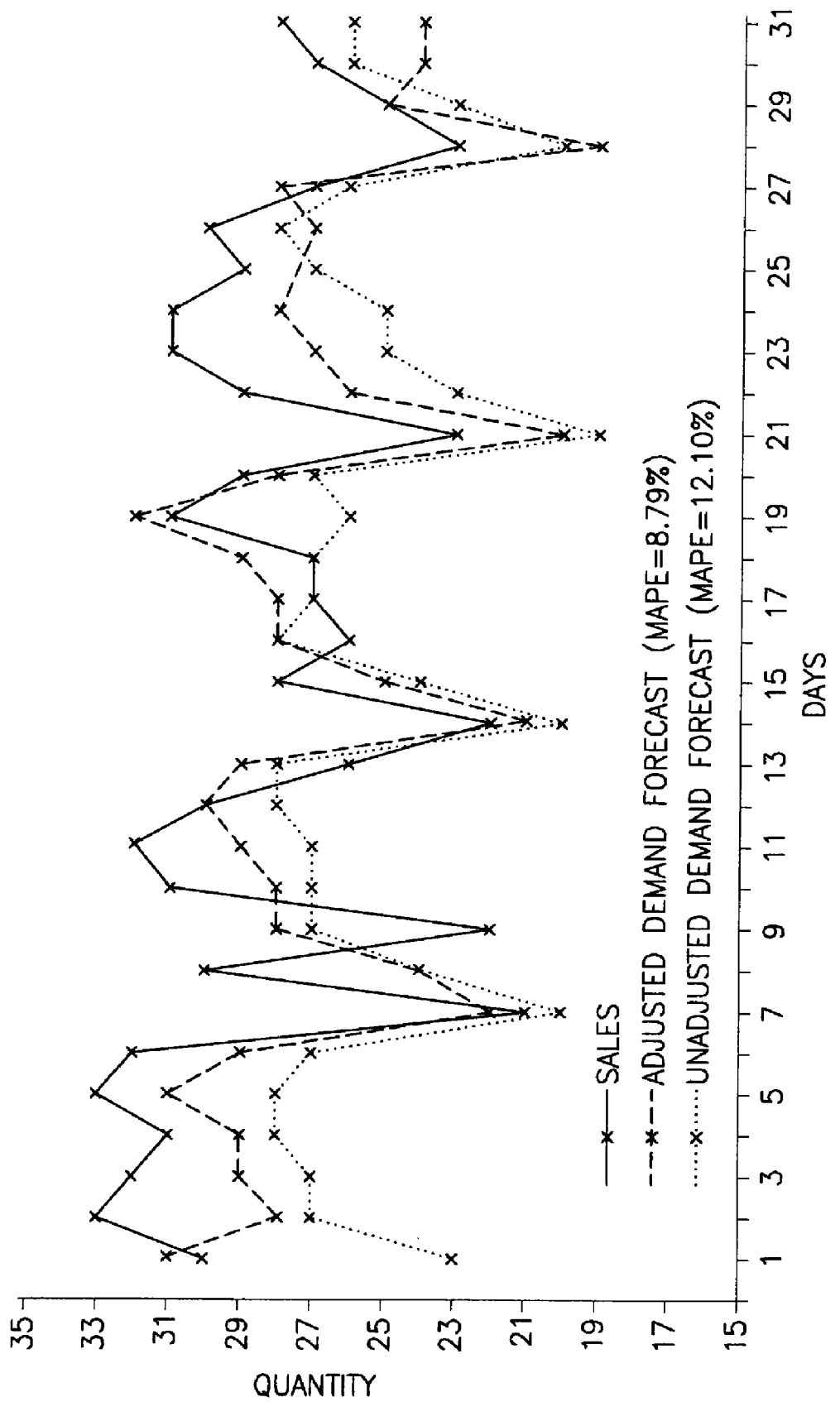
FIG. 6 is a graph comparing the efficacy of an adjusted demand forecast against sales for the newspaper with the efficacy of an unadjusted demand forecast against sales for the newspaper for the same period of a month of sales.

The adjusted sales data can be beneficially employed to improve demand forecasting as evidenced in FIG. 6 in which an adjusted demand forecast derived from adjusted sales data yields a reduced MAPE=8.79% as opposed to the MAPE=12.10% of an unadjusted demand forecast derived from unadjusted sales data where:

$$MAPE = \frac{\Sigma |\text{Actual Sales Values} - \text{Demand Forcast Values}|}{\Sigma | \text{Actual Sales Values}} \times 100\%$$

with the summation being over all the time points over a given period.

The evaluation of the efficacy of a recommended draw for a perishable consumer item, say, a newspaper, at an outlet to an actual draw over an evaluation period, say, a month, in accordance with the present invention is now described with reference to FIGS. 7 to 9. The entries in the different columns of the table of FIG. 7 are derived from the following relationships:

ES=min($S+H$,RD)

ER=RD−ES

ESO=δ($H+S$/RD)

EST=ESO*($S+H\geq$RD)

BS=min($S$,RD)

BR=RD−BS=max(0,RD−$S$)

BSO=δ(RD$\leq S$)

BST=max(0,$S$−RD)

The four bias columns of FIG. 7 show the biases in four performance metrics ES-BS, ER-BR, ESO-BSO and EST-BST which inherently exist by failing to take into account hidden demand at occurrences of sellouts, as particularly applies to Case 4. The four Δcolumns of FIG. 7 show the gains or losses in four performance metrics ES-S, ER-R, ESO-So and EST-ST by virtue of delivery of a consumer item to an outlet in accordance with a recommended draw as opposed to an actual draw.

Figure 8:
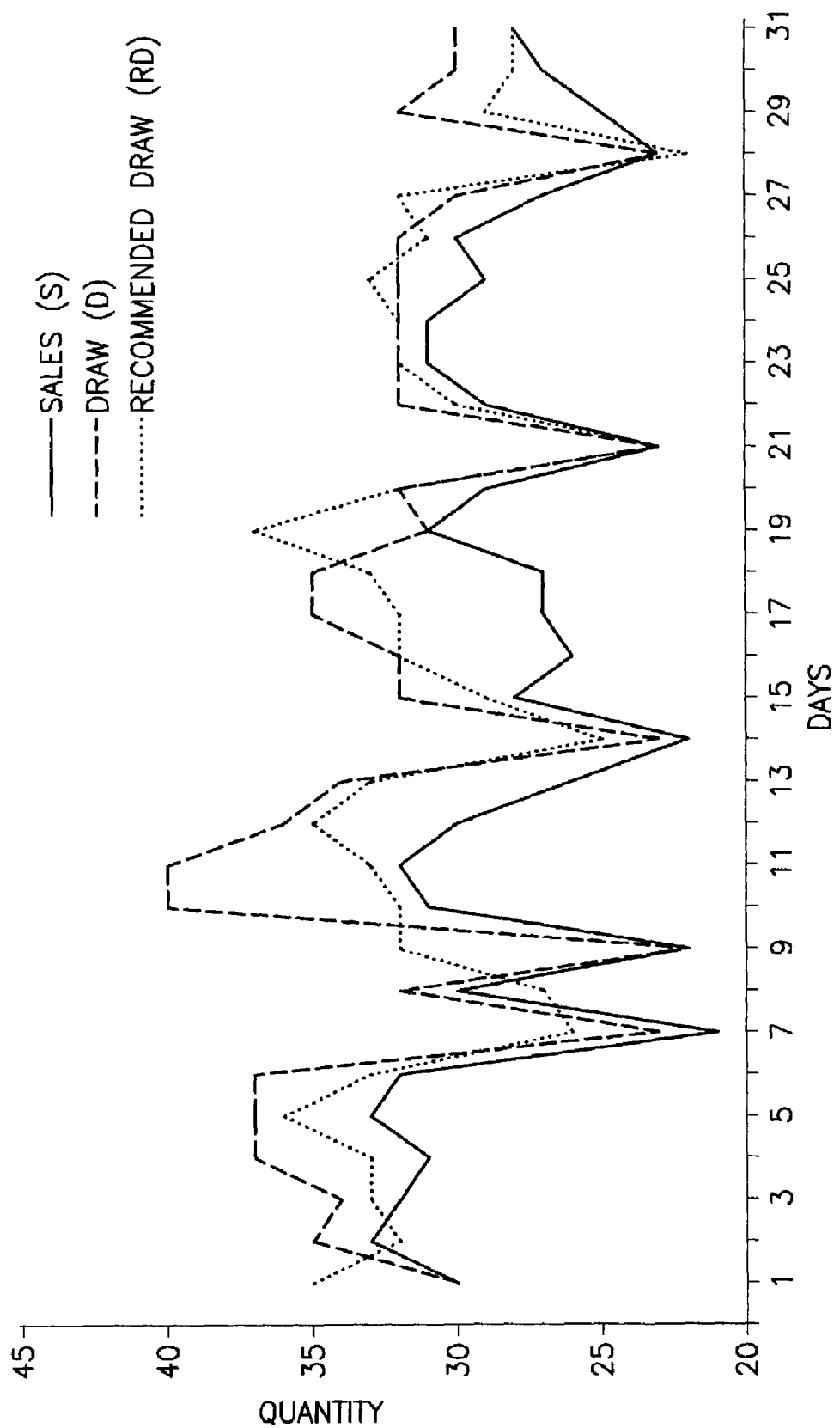
FIG. 8 is a graph showing a recommended draw for a newspaper for comparison with an actual draw and sales.

Turning now to FIGS. 8 and 9, the recommended draw (shown as a dashed line in FIG. 8) is preferably arrived at by initially running a forecast engine on historical adjusted sales data to estimate a demand forecast for the newspaper at the outlet. The hidden demand at the occurrences of sellouts is preferably estimated as described hereinabove with reference to FIGS. 4 and 5. Thereafter, safety stock is added to the demand forecast at each time point over the evaluation period in accordance with a predetermined availability percentage, say, 80%, typically rounded to the nearest integer to yield the recommended draw.

The month evaluation period includes five occurrences of sellouts (shown as circles in FIG. 7) on Days, 1, 9, 19, 21, and 28, namely, 16.13% sellouts, with total sales of 876 out of a total draw of 985 copies, namely, 11.07% return. The present invention estimates that the hidden demand at the occurrences of the sellouts on Days, 1, 9, 19, 21, and 28 is as follows: 5, 4, 5, 4, and 4, respectively, making for a total stockout of 22 copies which is the equivalent of 2.51% total sales and 2.23% total draw. The recommended draw would result in a lower draw of 960 copies as opposed to the actual draw of 985 copies but with only four occurrences of sellouts on Days 2, 8, 21, and 28. Not only is the recommended draw 2.54% lower than the actual draw but the recommended draw on taking into consideration the hidden demand at occurrences of sellout would achieve 1.03% higher expected sales of 885 copies as opposed to actual sales of 876 copies and as opposed to draw bounded sales of just 871 copies if the hidden demand at occurrences sellouts would not have been taken into account. The recommended draw on taking into account the hidden demand at the occurrences of sellout would be expected to render 12.90% sellouts and 7.81% returns with Column ES-R and ES-R in FIG. 9 showing the gained sales and reduced return achievable by the recommended draw in comparison to the actual draw.

While the invention has been described with respect to a limited number of embodiments, it will be appreciated that many variations, modifications, and other applications of the invention can be made within the scope of the appended claims. Other inferior approaches may be employed for arriving at mean demand values not requiring a run of a forecast engine, for example, assuming that a mean demand value for a perishable consumer item at an outlet at an occurrence of a sellout is the truncated sales value.

What is claimed is:

1. A computer-implemented method for estimating the hidden demand for a perishable consumer item at an outlet at an occurrence of a sellout for use with a demand forecast tree having at least one node with a time series of sales values associated therewith representing the actual sales of the perishable consumer item at the outlet over an observation period, the observation period comprising at least one occurrence of a sellout, the method comprising:

determining a subset of sales values of the time series of actual sales values over the observation period for the perishable consumer item at the outlet, the subset of sales values excluding the actual sales value(s) at the at least one occurrence of a sellout, the occurrence of the sellout being determined by comparing a sales value of the time series of sales values against a corresponding draw quantity of a time series of draw quantities;

applying, using a computer, a statistical seasonal causal time series forecasting model of count data on the subset of sales values to determine a forecasted mean demand value for the perishable consumer item at the outlet at the occurrence of the sellout; and estimating the hidden demand at the occurrence of the sellout using a single parameter probability distribution conditioned on the forecasted mean demand value, wherein the forecasted mean demand value is calculated from the subset of actual sales values excluding the actual sales value(s) at the at least one occurrence of the sellout; and wherein the single parameter probability distribution is conditioned on the forecasted mean demand value.

2. The method according to claim 1 wherein the single parameter probability distribution is Poisson.

3. The method according to claim 1 wherein the subset of sales values excludes the actual sales values at all occurrences of sellouts over the observation period.

4. The method according to claim 1 and further comprising:

calculating the value of at least one performance metric on the basis of adjusted sales data compensating for hidden demand at occurrences of sellouts over an evaluation period.

5. The method according to claim 4 wherein the step of calculating the value of at least one performance metric includes calculating the total stockout for the perishable consumer item at the outlet over the evaluation period for evaluating the efficacy of a distribution policy for the perishable consumer item at the outlet over the evaluation period.

6. The method according to claim 4 wherein the step of calculating the value of at least one performance metric includes calculating the value of at least one performance metric relating to the sale of the perishable consumer item at the outlet which could be expected to occur over the evaluation period by virtue of the perishable consumer item being delivered in accordance with a recommended distribution policy as opposed to an actual distribution policy for comparing the efficacy of the recommended distribution policy to the efficacy of the actual distribution policy over the evaluation period.

7. The method according to claim 6 wherein the step of calculating the value of at least one performance metric includes calculating the value of at least one performance metric from the following list of performance metrics: change in sales, change in returns, change in number of sellouts, and change in stockout.

8. The method according to claim 1 wherein the perishable consumer item is a printed media publication.

9. A computer-implemented system for estimating the hidden demand for a perishable consumer item at an outlet at an occurrence of a sellout for use with a demand forecast tree having at least one node with a time series of sales values associated therewith representing the actual sales of the perishable consumer item at the outlet over an observation period, the observation period comprising at least one occurrence of a sellout, the system comprising:
   a database server for storing time series of sales values over an observation period;
   a forecast engine server for computing demand forecast information for the demand forecast tree; and
   a processor for performing the steps of:
      determining a subset of sales values of the time series of actual sales values over the observation period for the perishable consumer item at the outlet, the new subset of sales values excluding the actual sales value(s) at the at least one occurrence of a sellout, the occurrence of the sellout being determined by comparing a sales value of the time series of sales values against a corresponding draw quantity of a time series of draw quantities;
      applying a statistical seasonal causal time series forecasting model of count data on the subset of sales values to determine a forecasted mean demand value for the perishable consumer item at the outlet at the occurrence of the sellout; and
      estimating the hidden demand at the occurrence of the sellout using a single parameter probability distribution conditioned on the forecasted mean demand value,
   wherein the forecasted mean demand value is calculated from the subset of actual sales values excluding the actual sales value(s) at the at least one occurrence of the sellout; and
   wherein the single parameter probability distribution is conditioned on the forecasted mean demand value.

10. The system according to claim 9 wherein the single parameter conditional probability distribution is Poisson.

11. The system according to claim 9 wherein the subset of sales values excludes the actual sales values at all occurrences of sellouts over the observation period.

12. The system according to claim 9 and further comprising executing a step of:
   calculating the value of at least one performance metric on the basis of adjusted sales data compensating for hidden demand at occurrences of sellouts over an evaluation period.

13. The system according to claim 12 wherein the step of calculating the value of at least one performance metric includes calculating the total stockout for the perishable consumer item at the outlet over the evaluation period for evaluating the efficacy of a distribution policy for the perishable consumer item at the outlet over the evaluation period.

14. The system according to claim 12 wherein the step of calculating the value of at least one performance metric includes calculating the value of at least one performance metric relating to the sale of the perishable consumer item at the outlet which could be expected to occur over the evaluation period by virtue of the perishable consumer item being delivered to the outlet in accordance with a recommended distribution policy as opposed to an actual distribution policy for comparing the efficacy of the recommended distribution policy to the efficacy of the actual distribution policy over the evaluation period.

15. The system according to claim 14 wherein the step of calculating the value of at least one performance metric includes calculating the value of at least one performance metric from the following list of performance metrics: change in sales, change in returns, change in number of sellouts, and change in stockout.

16. The system according to claim 9 wherein the perishable consumer item is a printed media publication.

\* \* \* \* \*

UNITED STATES PATENT AND TRADEMARK OFFICE
CERTIFICATE OF CORRECTION

PATENT NO. : 8,024,216 B2
APPLICATION NO. : 12/141771
DATED : September 20, 2011
INVENTOR(S) : Aronowich et al.

It is certified that error appears in the above-identified patent and that said Letters Patent is hereby corrected as shown below:

Title Page, item (56):

On front page, in column 2, under "U.S. Patent Documents", line 14, delete "705/10" and insert -- 705/7.31 --, therefor.

On page 2, in column 1, under "Other Publications", line 17, delete "Llng." and insert -- Ling. --, therefor.

On page 2, in column 2, under "Other Publications", line 1, delete "disttributions" and insert -- distributions --, therefor.

In column 4, line 39-43, delete "$H = E(X - D) | X \geq D) = \lambda\left(1 + \frac{f(D)}{1 - F(D)}\right) - D$"

and insert -- $H = E(X - D \mid X \geq D) = \lambda\left(1 + \frac{f(D)}{1 - F(D)}\right) - D$ --, therefor.

In column 5, line 32, delete "cared" and insert -- carried --, therefor.

In column 5, line 42, delete "char" and insert -- chart --, therefor.

In column 6, line 51-55, delete "$H = E(X - D) | X \geq D) = \lambda\left(1 + \frac{f(D)}{1 - F(D)}\right) - D$"

and insert -- $H = E(X - D \mid X \geq D) = \lambda\left(1 + \frac{f(D)}{1 - F(D)}\right) - D$ --, therefor.

Signed and Sealed this
Twenty-seventh Day of December, 2011

David J. Kappos
*Director of the United States Patent and Trademark Office*

In column 7, line 11-15, delete

" $$MAPE = \frac{\Sigma | Actual\ Sales\ Values - Demand\ Forcast\ Values |}{\Sigma | Actual\ Sales\ Values} \times 100\%$$ "

and insert --
$$MAPE = \frac{\Sigma | Actual\ Sales\ Values - Demand\ Forcast\ Values |}{\Sigma | Actual\ Sales\ Values |} \times 100\%$$
--, therefor.